United States Patent
Ata et al.

(10) Patent No.: US 10,494,492 B2
(45) Date of Patent: Dec. 3, 2019

(54) CARBON NANOTUBE-ELASTOMER COMPOSITE MATERIAL, SEAL MATERIAL AND SEALING MATERIAL EACH PRODUCED USING SAME, AND METHOD FOR PRODUCING CARBON NANOTUBE-ELASTOMER COMPOSITE MATERIAL

(71) Applicant: NATIONAL INSTITUTE OF ADVANCED INDUSTRIAL SCIENCE AND TECHNOLOGY, Tokyo (JP)

(72) Inventors: Seisuke Ata, Tsukuba (JP); Kenji Hata, Tsukuba (JP); Shigeki Tomonoh, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/681,113

(22) Filed: Aug. 18, 2017

(65) Prior Publication Data
US 2017/0369660 A1    Dec. 28, 2017

Related U.S. Application Data

(63) Continuation of application No. PCT/JP2016/054912, filed on Feb. 19, 2016.

(30) Foreign Application Priority Data

Feb. 19, 2015    (JP) ................................. 2015-031162

(51) Int. Cl.
*C08J 5/00* (2006.01)
*C08K 3/04* (2006.01)
(Continued)

(52) U.S. Cl.
CPC ............. *C08J 5/005* (2013.01); *C01B 32/174* (2017.08); *C08K 3/041* (2017.05); *C08L 21/00* (2013.01);
(Continued)

(58) Field of Classification Search
CPC ................................. C08J 5/005; C08K 3/041
See application file for complete search history.

(56) References Cited

U.S. PATENT DOCUMENTS 7,619,029 B1    11/2009  Noguchi et al.
9,688,897 B2 *   6/2017  Hata ........................ H01B 1/24
(Continued)

FOREIGN PATENT DOCUMENTS

CN      103201214 A    7/2013
CN      103764556 A    4/2014
(Continued)

OTHER PUBLICATIONS

Datasheet of DAI-EL G-912 from Daikin, Nov. 2001.*
(Continued)

*Primary Examiner* — Vu A Nguyen
(74) *Attorney, Agent, or Firm* — Hauptman Ham, LLP (57) ABSTRACT

A carbon nanotube-elastomer composite material according to the present invention is produced by dispersing a carbon nanotube in an elastomer, including a carbon nanotube having a diameter of 20 nm or less, the number of layers of 10 or less, the carbon nanotube being contained in an amount of 0.1 to 20 parts by weight inclusive relative to the total weight of the carbon nanotube and the elastomer, and a continuous network having a $V_a/V_0$ value of 0.5 or more is formed in the elastomer wherein $V_0$ represents the initial volume of the composite material and $V_a$ represents the volume of the structure formed from the remaining carbon nanotubes when the composite material is maintained at a
(Continued)

temperature of 400° C. or higher for 6 hours while introducing nitrogen, the elastomer is thermally decomposed and the remaining carbon nanotubes form a structure.

16 Claims, 3 Drawing Sheets

(51) Int. Cl.
    *C08L 21/00*     (2006.01)
    *C08L 101/00*     (2006.01)
    *C01B 32/174*     (2017.01)
    *B82Y 30/00*     (2011.01)

(52) U.S. Cl.
    CPC ............. *C08L 101/00* (2013.01); *B82Y 30/00* (2013.01); *C01B 2202/02* (2013.01); *C01B 2202/06* (2013.01); *C08J 2321/00* (2013.01)

(56) References Cited

U.S. PATENT DOCUMENTS

| | | |
|---|---|---|
| 2007/0100058 A1 | 5/2007 | Noguchi et al. |
| 2009/0306270 A1 | 12/2009 | Noguchi et al. |
| 2013/0316160 A1 | 11/2013 | Hata et al. |
| 2014/0221533 A1 | 8/2014 | Hata et al. |
| 2014/0291589 A1 | 10/2014 | Hata et al. |

FOREIGN PATENT DOCUMENTS

| | | |
|---|---|---|
| CN | 103842445 A | 6/2014 |
| JP | 2007-39638 A | 2/2007 |
| JP | 2007-39648 A | 2/2007 |
| JP | 2007-273283 A | 10/2007 |
| JP | 2008-24800 A | 2/2008 |
| JP | 5197288 B2 | 5/2013 |
| JP | 5374047 B2 | 12/2013 |
| WO | 2012/060454 A1 | 5/2012 |
| WO | 2013/051707 A1 | 4/2013 |

OTHER PUBLICATIONS

Koji Tsuchiya et al., "High electrical performance of carbon nanotubes/rubber composites with low percolation threshold prepared with a rotation-revolution mixing technique", Composites Science and Technology 71, Apr. 14, 2011, p. 1098-1104.
Written Opinion of the International Searching Authority dated Apr. 5, 2016 for PCT/JP2016/054912.
International Search Report dated Apr. 5, 2016 for PCT/JP2016/054912 with English translation.
English Translation of the Written Opinion dated Apr. 5, 2016 corresponding to International Application No. PCT/JP2016/054912.
Office Action dated Jun. 11, 2019 for the corresponding Japanese patent application No. 2017-500762, with partial English machine translation.
Chinese Office Action dated Jul. 26, 2019 for the corresponding Chinese patent application No. 201680009723.5, citing the above references, with partial English machine translation.

* cited by examiner

| | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| CNT | SG | SG | SG | Nanocyl | C-Nano | SG | SG | SG | CB | CF | |
| CNT parts by weight | 1 | 0.1 | 10 | 5 | 5 | 1 | 1 | 1 | 10 | 10 | |
| Elastomer Species | Ternary FKM | Ternary FKM | Ternary FKM | Ternary FKM | Ternary FKM | Binary FKM | H-NBR | ACM | Ternary FKM | Ternary FKM | Ternary FKM |
| CNT structure ratio (residual material/complex) | 0.8 | 0.5 | 0.9 | 0.6 | 0.5 | 0.6 | 0.7 | 0.6 | 0.1 | 0.2 | 0 |
| Tear Strength | 18 | 11 | 42 | 18 | 21 | 15 | 12 | 13 | 8 | 7 | 6 |
| Storage modulus (100°C)(Pa) | 9.10E+06 | 5.37E+06 | 2.19E+08 | 3.28E+07 | 2.15E+07 | 6.87E+06 | 5.76E+06 | 5.91E+06 | 4.49E+06 | NA | 3.87E+06 |
| Chemical resistance (Variation of tensile strength)(MPa) | -2.3 | -2.5 | -0.03 | 1.2 | -1.2 | -1.1 | -0.07 | 0.73 | -4.1 | -4.2 | -5.5 |
| Oil resistant (Variation of hardness) | -1.1 | -1.3 | -0.8 | -1.5 | -1.2 | -1.8 | -1.3 | -1.2 | -4.8 | -7.2 | -10.2 |
| Pore distribution | 15nm | 22nm | 18nm | 32nm | 45nm | 28nm | 18nm | 21nm | - | - | - |
| Conductivity (20% strain) (S/cm) | 0.8 | 0.005 | 24 | 4.2 | 3.6 | 0.7 | 0.5 | 0.6 | ≤10⁻⁸ | ≤10⁻⁸ | ≤10⁻⁸ |
| Tensile strength (150°C)(MPa) | 6.52 | 5.11 | 18.62 | 6.56 | 12.14 | 5.61 | 5.23 | 5.12 | 2.25 | 2.99 | 2.55 |
| Storage modulus (150°C)(Pa) | 9.89E+06 | 6.06E+06 | 1.78E+07 | 3.33E+07 | 2.24E+07 | 6.73E+06 | 6.07E+06 | 5.35E+06 | 4.67E+06 | 8.28+E05 | 4.38E+05 |
| loss tangent (150°C) | 0.1317 | 0.12177 | 0.09855 | 0.12739 | 0.1505 | 0.06325 | 0.05616 | 0.17955 | 0.31 | 0.32 | 0.45 |
| Linear expansion coefficient (90-140°C) | 2.74E-04 | 2.76E-04 | 7.73E-05 | 1.28E-04 | 1.56E-04 | 2.40E-04 | 2.04E-04 | 1.75E-04 | 2.31E-04 | 2.13E-04 | 2.79E-04 |
| Glass transition temperature(°C) | -7.2 | -5.6 | -7.2 | -6.7 | -7.2 | -22.1 | -31.1 | -35.0 | -6.1 | -8.3 | -6.1 |

CARBON NANOTUBE-ELASTOMER COMPOSITE MATERIAL, SEAL MATERIAL AND SEALING MATERIAL EACH PRODUCED USING SAME, AND METHOD FOR PRODUCING CARBON NANOTUBE-ELASTOMER COMPOSITE MATERIAL

CROSS REFERENCE TO RELATED APPLICATIONS

This application is a continuation of International Application No. PCT/JP2016/054912, filed on Feb. 19, 2016, which claims priority to Japanese Patent Application No. 2015-031162, filed on Feb. 19, 2015. The entire disclosures of each of the above applications are incorporated herein by reference.

FIELD

The present invention relates to a carbon nanotube-elastomer composite material, a seal material and a sealing material each produced using the same, and a method for producing the carbon nanotube-elastomer composite material.

BACKGROUND

The elastomer, which is soft and exhibits rubber elasticity, has been used in a wide range of applications, such as a sealing material, an absorber and the like. However, when the elastomer is exposed to acid, alkali, ultraviolet rays or the like, its molecular weight is lowered by, for example, a depolymerization reaction caused by hydrolysis or the like, with the result that its physical properties deteriorate. Moreover, depending on applications, higher mechanical strength (tearing strength, Young's Modulus, or the like), conductive characteristic, and the like are required.

By combining the elastomer with a filler having a nanoscale diameter, such as, for example, carbon nanotubes (hereinafter, referred to also as CNT) as a composite component, attempts have been made so as to improve the mechanical strength, conductive characteristic and the like. For example, in Japanese Patent Publication No. 5374047, a carbon fiber composite material has been reported on which an interface phase that is considered to be an aggregate of molecules of a fluorine-containing elastomer adsorbed on the surface of a vapor-growth carbon fibers that are similar to bound rubber formed on the periphery of carbon black when dispersing multi-layer carbon nanotubes in a binary or ternary synthetic rubber containing fluorine atoms in its molecule and kneading a fluorine-containing elastomer and carbon black. Japanese Patent Publication No. 5374047 has described that as the amount of the vapor-growth carbon fiber increases, the interface phases are mutually chain-connected to one another to form minute cells and in the case when the multi-walled carbon nanotubes in the carbon fiber composite material are set to an optimal ratio, invasion of oxygen into the cells of the carbon fiber composite material is reduced by the chain-connected interface phases so that the material becomes less susceptible to thermal deterioration and makes it possible to maintain high elastic modulus.

Moreover, Japanese Patent Publication No. 5197288 has reported a fiber composite material in which single-walled carbon nanotubes or multi-walled carbon nanotubes and natural fibers or metal fibers are dispersed in an elastomer. Japanese Patent Publication No. 5197288 has described that by surrounding an elastomer forming a matrix with fibers and carbon nanofibers, a restraining region is formed and the mobility of elastomer molecules restrained by the fibers and carbon nanofibers becomes lower than that in the case of being not restrained by the fibers and carbon nanofibers.

SUMMARY

However, although conventionally, examinations have been given on heat resistance and viscoelasticity at the time of heating, no examination has been given on the tear strength and chemical resistance of the carbon nanotube-elastomer composite material.

The present invention provides a carbon nanotube-elastomer composite material superior in tear strength and chemical resistance, and a seal material and a sealing material each produced using the same, and a method for producing the carbon nanotube-elastomer composite material.

In accordance with an embodiment of the present invention, a carbon nanotube-elastomer composite material dispersing a carbon nanotube in an elastomer is provided in which the carbon nanotube has a diameter of 20 nm or less and layers the number of which is 10 or less, and the carbon nanotube is contained at 0.1 parts by weight or more to 20 parts by weight or less, with respect to the total weight of the carbon nanotube and the elastomer, and a continuous network has a $Va/V_0$ of 0.5 or more, supposing that the initial volume of the carbon nanotube-elastomer composite material is $V_0$ and the volume of the residual carbon nanotube structure is Va is formed in the elastomer when maintained for 6 hours under introduction of nitrogen at a temperature of 400° C. or more, the elastomer is thermally decomposed so that the residual carbon nanotubes form a structure.

Moreover, in accordance with the embodiment of the present invention, a carbon nanotube-elastomer composite material dispersing a carbon nanotube in an elastomer is provided in which a continuous network has a $Va/V_0$ is set to 0.5 or more supposing that the initial volume of the carbon nanotube-elastomer composite material is $V_0$ and the volume of the residual carbon nanotube structure is Va when maintained for 6 hours under introduction of nitrogen at a temperature of 400° C. or more, the elastomer is thermally decomposed so that the residual carbon nanotubes form a structure; thus, such a carbon nanotube-elastomer composite material which has, and the continuous network is provided with at least one or more peaks of pore distribution within a range of 1 nm or more to 100 μm or less.

The tear strength of the carbon nanotube-elastomer composite material may be 10 N/mm or more.

The elastic modulus of the carbon nanotube-elastomer composite material at 100° C. may be 20% higher than the elastic modulus at 100° C. of an elastomer composite material without containing the carbon nanotube.

The variation amount of tensile strength after the carbon nanotube-elastomer composite material has been immersed in methyl isobutyl ketone for 72 hours may be set to 4 MPa or less.

The change in Shore A hardness after the carbon nanotube-elastomer composite material has been immersed in gasoline oil (gasoline 85%, ethanol 15%) for 72 hours may be set to 4 or less.

When a strain of 20% is given to the carbon nanotube-elastomer composite material, the resulting conductivity thereof may be located in a range from 50% or more to 150% or less relative to the conductivity at the time of a strain of 0%.

In the carbon nanotube-elastomer composite material, the tensile strength in a tensile strength test (in compliance with JIS K6251) at a temperature of 20° C. or more to 150° C. or less may be set to 5 MPa or more.

In the carbon nanotube-elastomer composite material, at 150° C., the storage modulus may be set to 0.5 MPa or more, and the loss tangent may be set to 0.1 or less.

In the carbon nanotube-elastomer composite material, in a range from room temperature to 150° C., the thermal expansion coefficient may be set to $6\times10^{-4}$/K or less.

The carbon nanotube-elastomer composite material may have a glass transition temperature Tg in a range from −50° C. or more to 10° C. or less.

In the carbon nanotube-elastomer composite material, the specific surface area of the carbon nanotube may be set to 200 $m^2$/g or more.

In the carbon nanotube-elastomer composite material, the diameter of the carbon nanotube may be set to 20 nm or less.

In the carbon nanotube-elastomer composite material, the number of layers of the carbon nanotube may be set to 10 layers or less.

Moreover, in accordance with another embodiment of the present invention, a production method of a carbon nanotube-elastomer composite material is provided in which fibrillated carbon nanotubes are prepared, the fibrillated carbon nanotubes are allowed to contain an elastomer and a crosslinker, and the carbon nanotubes, elastomer and crosslinker are molded and cross-link cured.

Furthermore, in accordance with another embodiment of the present invention, an endless seal material having an endless shape, with its outer shape continuously formed, that is formed by using any of the above-mentioned carbon nanotube-elastomer composite materials is provided.

Furthermore, in accordance with the other embodiment of the present invention, a sealing material that is formed by using any of the above-mentioned carbon nanotube-elastomer composite materials is provided.

BRIEF DESCRIPTION OF DRAWINGS

FIG. 1A shows a cross-sectional view showing one portion of the carbon nanotube-elastomer composite material 100;

FIG. 3 is a table showing characteristics of the carbon nanotube-elastomer composite material relating to the embodiment of the present invention.

REFERENCE SIGNS LIST

10 . . . CNT, 30 . . . elastomer, 50 . . . CNT structure, 100 . . . carbon nanotube-elastomer composite material

DESCRIPTION OF EMBODIMENTS

Referring to Figures, the following description will explain a carbon nanotube-elastomer composite material in accordance with the present invention, a seal material and a sealing material each produced using the same, and a method for producing the carbon nanotube-elastomer composite material. Additionally, the carbon nanotube-elastomer composite material in accordance with the present invention, a seal material and a sealing material each produced using the same, and a method for producing the carbon nanotube-elastomer composite material should not be restrictively interpreted based upon embodiments and the contents of examples shown below. Additionally, in the Figures to be referred to in the present embodiment and examples to be described later, the same parts and parts having the same functions are indicated by the same reference numeral and repetitive explanations thereof will be omitted.

The carbon nanotube-elastomer composite material relating to the present invention, which is a carbon nanotube-elastomer composite material formed by dispersing a carbon nanotube (CNT) in an elastomer, and CNT is contained in a range of 0.1 parts by weight or more to 20 parts by weight or less relative to the total weight of the CNTs and elastomer. The CNT has a diameter of 20 nm or less and layers the number of which is 10 or less. Moreover, the carbon nanotube-elastomer composite material in accordance with the present invention is designed such that when maintained for 6 hours under introduction of nitrogen at a temperature of 400° C. or more, preferably at 500° C., more preferably at 600° C. or more, the elastomer is thermally decomposed so that the residual CNTs forms a structure; thus, a continuous network in which, supposing that the initial volume of the carbon nanotube-elastomer composite material is $V_0$ and the volume of the residual CNT structure is Va, $Va/V_0$ is set to 0.5 or more, preferably, 0.6 or more, more preferably, 0.7 or more, further more preferably, 0.8 or more, and the most preferably, 0.9 or more, is formed inside the elastomer.

Figure 1A:
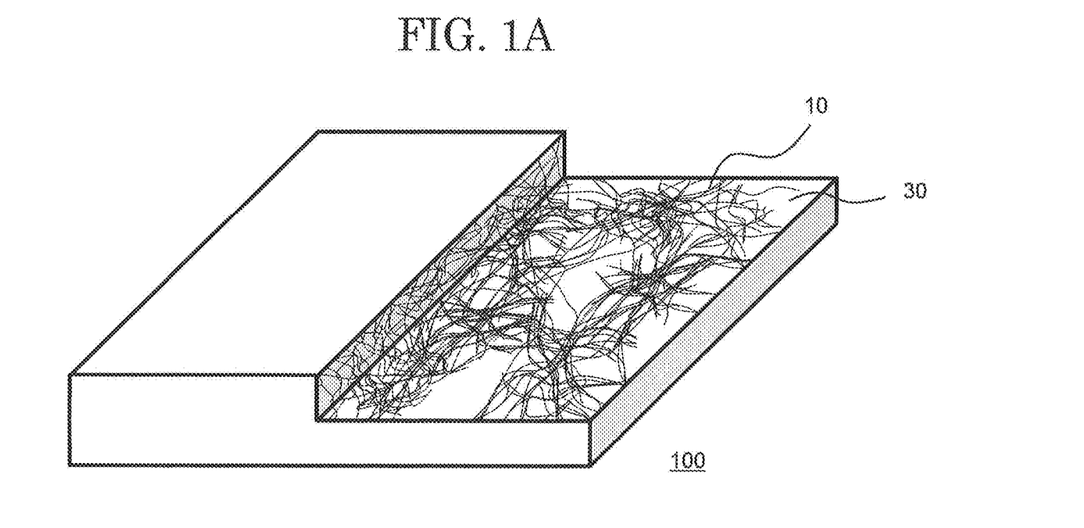
FIG. 1A is a schematic view that shows a carbon nanotube-elastomer composite material 100 in accordance with one embodiment of the present invention.
Figure 1B:
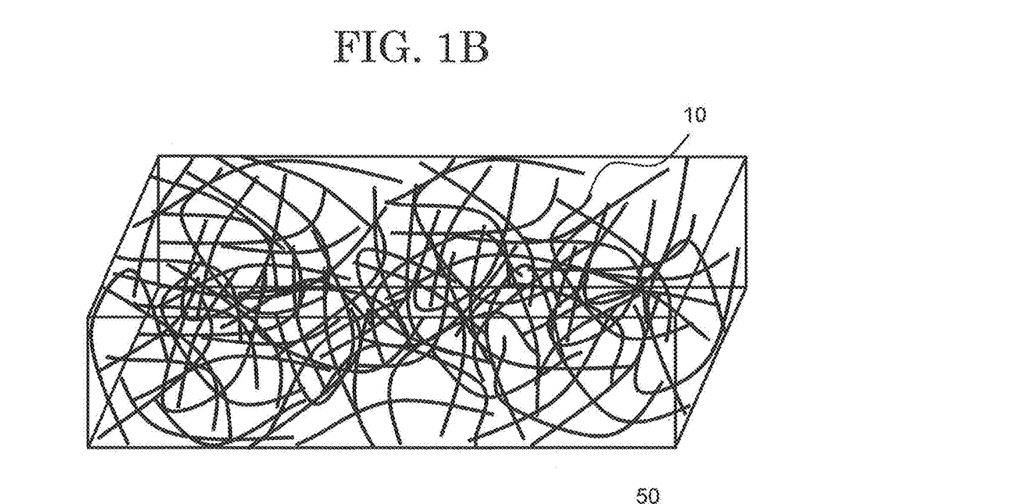
FIG. 1B is a schematic view showing a structure obtained after burning the carbon nanotube-elastomer composite material 100.
Figure 2:
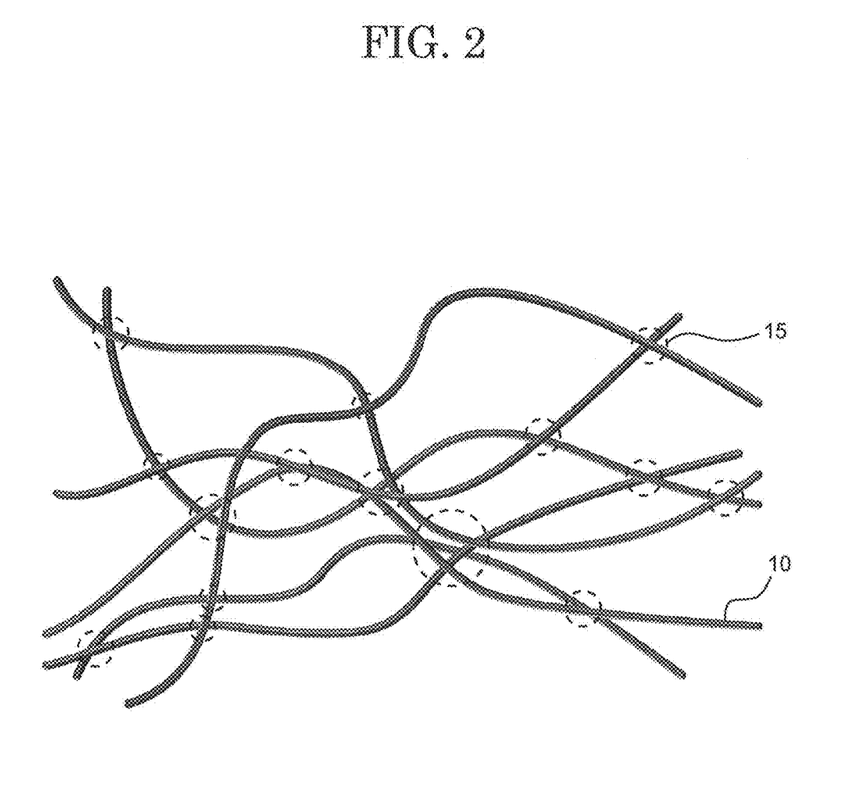
FIG. 2 is a schematic view showing a continuous network obtained by enlarging one portion of a CNT structure 50 in the carbon nanotube-elastomer composite material 100 relating to the embodiment of the present invention.

FIGS. 1A and 1B are schematic views showing a carbon nanotube-elastomer composite material 100 relating to one embodiment of the present invention. FIG. 1A is a cross-sectional view showing one portion of the carbon nanotube-elastomer composite material 100, and FIG. 1B is a schematic view showing a structure formed after burning the carbon nanotube-elastomer composite material 100. The carbon nanotube-elastomer composite material 100 contains CNT 10 and an elastomer 30, and in the elastomer 30, a carbon nanotube structure (hereinafter, referred to also as CNT structure) 50 which is provided with a continuous network formed by the CNTs 10 highly fibrillated, with the CNTs 10 being made in contact with one another. FIG. 2 is a schematic view showing the continuous network obtained by enlarging one portion of the CNT structure 50 in the carbon nanotube-elastomer composite material 100 relating to the embodiment of the present invention.

The CNT 10 contained in the carbon nanotube-elastomer composite material 100 relating to the embodiment of the present invention has a structure in which CNTs 10 are fibrillated from a bunch (bundle) of CNT 10. In the carbon nanotube-elastomer composite material 100, the CNTs 10 are physically entangled with one another to form a continuous network that is highly developed.

In the case when the contact between the CNTs 10 is tight, even if the elastomer 30 disappears, no change occurs in bulk density so that the volume ratio is maintained at 1. On the other hand, in the case when the contact between CNTs 10 is not so tight, with many pores being located between the CNTs 10, since the volume is contracted when the elastomer 30 disappears, the volume ratio comes closer to zero, that is, the volume ratios before and after the disappearance (before and after the heating treatment) of the elastomer 30 reflect the tightness of the continuous network of the CNTs 10. As the volume ratio comes closer to 1, the carbon nanotube-elastomer composite material 100 allows the CNTs 10 in the elastomer 30 to form the continuous network to become dynamically solid, chemically stable, thereby making it possible to exert superior characteristics such as high tear resistant characteristic or the like.

In accordance with one embodiment, when the carbon nanotube-elastomer composite material 100 is maintained under a nitrogen atmosphere at 500° C. for 6 hours or more, the residual CNTs 10 forms a CNT structure 50, and the ratio of the bulk volume of the CNT structure 50 forming the residual CNTs 10 after the burning process relative to the volume of the carbon nanotube-elastomer composite material 100 before the burning process is set to 0.5 or more, preferably, 0.6 or more, more preferably, 0.7 or more, further more preferably, 0.8 or more, and the most preferably, 0.9 or more, and also set to 1.0 or less. When the elastomer 30 is sublimated under a nitrogen atmosphere, the residual CNTs are not parted, and form a CNT structure 50 that has no volume change relative to the carbon nanotube-elastomer composite material. This means that inside the elastomer, the CNTs 10 are mutually made in contact with one another to form a continuous network having a dynamically holding strength. This CNT structure 50 makes it possible to impart robustness to the elastomer 30 like reinforcing bars in concrete, as well as superior dynamical and chemical characteristics thereto.

By fibrillating the CNTs 10 separately, without being formed into a bundle, the area of the interface between the CNTs 10 and the elastomer 30 is increased. The fibrillated CNTs 10 are physically made in contact with one another to form conductive paths. Since the CNTs 10 are physically made in contact with one another, physical contact points 15 among the CNTs 10 suppress the contraction of the CNTs 10, even when the elastomer 30 has been removed, so that in the carbon nanotube-elastomer composite material 100 relating to the present invention, the bulk density, that is, an apparent volume, is not lowered. The intervals between the physical contact points 15 of the CNTs 10 observed by a scanning type electron microscope (SEM) are about 1 μm or more to 100 μm or less. As a method for measuring the intervals between the physical contact points 15 of the CNTs 10, for example, a dynamic mechanical characteristic measuring device (DMA) is proposed. With respect to the carbon nanotube-elastomer composite material 100 relating to the present invention, when the applied frequency is varied from 0.001 Hz to 1000 Hz at room temperature, an elastic modulus region that is not dependent on the frequency appears (plateau region). The storage modulus of the carbon nanotube-elastomer composite material 100 in the plateau region is in a range from $10^3$ Pa or more to $10^6$ Pa or less. In the carbon nanotube-elastomer composite material 100 relating to the present invention, the distance between the physical contact points 15 can be estimated from the elastic modulus.

(Pore Distribution of Carbon Nanotube Structure)

In the case when the carbon nanotube-elastomer composite material 100 is maintained under a nitrogen atmosphere at 500° C. for 6 hours or more, with respect to the pore distribution in the residual CNT structure 50, one or more peaks are present within a range from 1 nm or more to 100 μm or less. In this case, the pore distribution can be measured by a porosimeter of mercury porosimetry. The peak corresponds to a point where the differential pore volume becomes 0, and also corresponds to a point where the differential pore volume becomes a positive value from a negative value. Since the carbon nanotube-elastomer composite material 100 having such peaks has the continuous network of the CNTs 10 formed therein, it is possible to remain the CNT structure 50. On the other hand, when the continuous network is not formed, the residual body of CNTs is compressed or scattered so that it is not possible to maintain the CNT structure 50.

(Tear Strength)

In an embodiment, the tear strength of the carbon nanotube-elastomer composite material 100 is set to 5 N/mm or more, and preferably to 10 N/mm or more. In comparison with an elastomer without containing CNT10, the carbon nanotube-elastomer composite material 100 has a tear strength greater by 10%, preferably, by 20%, more preferably, by 30% or more. The carbon nanotube-elastomer composite material 100 having such high tear strength hardly have a crack developed from a damaged portion, a scratch or the like; therefore, it is superior in product reliability, and desirably used for a sealing material or the like. Since the carbon nanotube-elastomer composite material relating to the present invention makes it possible to prevent a crack from developing because the CNTs 10 form the continuous network in the elastomer 30, it has high tear strength.

(Elastic Modulus at 100° C.)

In an embodiment, in comparison with an elastomer without containing CNT, the elastic modulus at 100° C. of the carbon nanotube-elastomer composite material 100 is higher by 20% or more, preferably, by 50% or more, more preferably, by 100% or more, and is also lower than 1000%. Such a high elastic modulus at 100° C. makes it possible to be used for a sealing material or the like, under high temperatures where the elastomer 30 is softened. Since the carbon nanotube-elastomer composite material 100 relating to the present invention allows the CNTs 10 to form a continuous network in the elastomer 30, the CNTs 10 dynamically reinforces the elastomer 30 so that even at 100° C. where the elastomer 30 is softened, it exerts superior mechanical characteristics as a sealing material, and is desirably used.

(Tensile Strength)

In an embodiment, the carbon nanotube-elastomer composite material 100, the tensile strength measured in a tensile strength test (in compliance with JIS K6251) at a temperature of 20° C. or more to 150° C. is set to 1 MPa or more, preferably, to 5 MPa or more, and more preferably, to 10 MPa or more, and is also set to 100 MPa or less. In the case of the tensile strength smaller than 1 MPa, the resulting material exerts a liquid state characteristic. On the other hand, when the tensile strength is 1 MPa or more, the resulting material exerts rubber elasticity, and can be used as a sealing material. In the carbon nanotube-elastomer composite material 100 relating to the present invention, the CNTs 10 form a continuous network in the elastomer 30 forming a matrix. Different from high molecular materials such as general rubber or the like, the CNT10 is not softened even when it is heated. For this reason, the composite material makes it possible to maintain sufficient tensile strength even at a high temperature of 150° C.

(Chemical Resistant Characteristic)

In an embodiment, after the carbon nanotube-elastomer composite material 100 has been immersed in methyl isobutyl ketone for 72 hours, preferably, for 144 hours, the variation amount of physical properties (elastic modulus, hardness) thereof becomes smaller than the variation amount of an elastomer without containing CNT by 20% or more, preferably, by 40% or more, more preferably, by 60% or more. Even when the carbon nanotube-elastomer composite material 100 relating to the present invention is immersed in methyl isobutyl ketone that is an effective solvent for swelling the elastomer 30, the continuous network of the CNTs 10 constructed within the system suppresses the swelling of the elastomer 30, making it possible to suppress deterioration of the mechanical characteristics. For this reason, the carbon nanotube-elastomer composite material 100 is desirably used as such a sealing material as to be used in various organic solvents.

(Oil Resistant Characteristic)

In an embodiment, after the carbon nanotube-elastomer composite material 100 has been immersed in gasoline oil (gasoline 85%, ethanol 15%) for 72 hours, preferably, for 144 hours, a change in physical properties (elastic modulus, hardness) becomes smaller than a change in hardness of an elastomer without containing CNT by 30% or less, preferably, by 10% or less. Even when the carbon nanotube-elastomer composite material 100 relating to the present invention is immersed in mineral oil that is an effective solvent for swelling the elastomer 30, the continuous network of the CNTs 10 constructed within the system suppresses the swelling of the elastomer 30, making it possible to suppress deterioration of the mechanical characteristics. For this reason, the carbon nanotube-elastomer composite material 100 is desirably used as such a sealing material as to be used in various mineral oils.

(Change in Conductivity Due to Strain)

In an embodiment, in the case when a strain of 20% is applied to the carbon nanotube-elastomer composite material 100, the conductivity thereof is in a range of 50% or more to 150% or less relative to the conductivity at the time of a strain of 0%.

In an present embodiment, the variation in conductivity due to strain can be measured by processes in which with respect to a dog bone type test piece formed in compliance with JIS K 6251 of the carbon nanotube-elastomer composite material 100, electrodes are attached to upper and lower portions thereof, and a strain is given to the sample while extending it at 10 mm/min by a tensile tester, so that the change in resistance is found. The distance between the electrodes can be calculated from the tensile speed, and the cross-sectional area of the sample is calculated from the extension rate by setting a Poisson ratio of the sample at 0.5, so that the conductivity at each strain is calculated. The measurement of the conductivity is carried out by a 4-terminal method.

In an embodiment, when the carbon nanotube-elastomer composite material 100 is heated by a dynamic mechanical characteristic measuring device from room temperature at a rate of 10° C./min, the storage modulus at 150° C. is set to 0.5 MPa or more, preferably, to 1 MPa or more, more preferably, in range from 5 MPa or more to 100 MPa or less, and the loss tangent thereof is set to 0.1 or less, preferably, to 0.05 or less, and is also set to 0.001 or more. In the carbon nanotube-elastomer composite material 100 relating to the present invention, by setting the storage modulus and the loss tangent in these ranges, rubber elasticity inherent to the elastomer can be maintained even under high temperatures. Thus, the carbon nanotube-elastomer composite material 100 can be used for a sealing material or the like even at high temperatures.

The carbon nanotube-elastomer composite material 100 relating to the present invention allows fibrillated CNTs 10 to constitute a solid continuous network in the elastomer 30. Since the CNT10 is hardly softened by a temperature rise, it becomes possible to maintain a storage modulus of 0.5 MPa or more even at 150° C.

(Thermal Expansion Coefficient)

In an embodiment, the carbon nanotube-elastomer composite material 100 has a linear expansion coefficient of $6 \times 10^{-4}$/K or less in a range from room temperature to 150° C., preferably, $2 \times 10^{-4}$/K or less, and $-1 \times 10^{-4}$/K or more. In the carbon nanotube-elastomer composite material 100, a sealing material attached at room temperature is not slackened by a thermal expansion, and can be used even at high temperatures. As shown in FIGS. 1A and 1B, in the carbon nanotube-elastomer composite material 100 relating to the present invention, since the CNT10 having a linear negative thermal expansion coefficient forms a CNT structure 50 constituted by CNTs forming a continuous network in the elastomer 30, the thermal expansion of the elastomer 30 can be suppressed.

In an embodiment, the glass transition temperature of the carbon nanotube-elastomer composite material 100 is set in a range from −50° C. or more to 10° C. or less, preferably, in a range from −50° C. or more to −10° C. or less. In the carbon nanotube-elastomer composite material 100 relating to the present invention, since the carbon nanotube-elastomer composite material 100 having such a glass transition temperature exerts rubber elasticity inherent to the elastomer at room temperature, it can be used as a sealing material or the like. In general, upon adding a filler to an elastomer, its glass transition temperature is raised by the suppression of molecular movements of elastomer molecules by the filler. In the carbon nanotube-elastomer composite material 100 relating to the present invention, since the CNT10 does not suppress molecular movements of the elastomer 30, the change in the glass transition temperature by the addition of the CNT10 can be reduced.

(Content of Carbon Nanotubes)

In an embodiment, the carbon nanotube-elastomer composite material 100 contains CNT in a range from 0.1 parts by weight or more to 20 parts by weight or less, preferably, from 0.3 parts by weight or more to 10 parts by weight or less, more preferably, from 0.5 parts by weight or more to 15 parts by weight or less, relative to the total weight of the carbon nanotube-elastomer composite material 100. When the content of the CNT is less than 0.1 parts by weight, it is not possible to form a sufficiently developed continuous network in the carbon nanotube-elastomer composite material 100. Moreover, when the content of the CNT is greater than 20 parts by weight, the viscoelasticity inherent to the elastomer is not sufficiently exerted, with the result that when used as a sealing material and a sheet-shaped material, required flexibility and following property cannot obtained, causing an undesirable state.

(Diameter of Carbon Nanotube)

As shown in FIGS. 1A and 1B, the CNTs 10 contained in the carbon nanotube-elastomer composite material 100 allows the CNTs 10 to intersect with a plurality of the CNTs 10 so that a network structure combined with points by Van der Waals' forces is formed. The diameter of the CNT10 is 20 nm or less, preferably, 10 nm or less, more preferably, 7.0 nm or less, further more preferably, 4 nm or less, and is 0.5 nm or more. The CNT10 having such a small diameter makes it possible to provide a large specific surface area and also to provide more contact points among CNTs required for forming a continuous network, thereby making it possible to easily form the continuous network desirably.

Moreover, the number of layers of the CNT10 has 10 layers or less, preferably 5 layers or less, more preferably 2 layers or less, and the most preferably a single layer. In this case, the number of layers of the CNT corresponds to the average number of layers of 100 CNTs observed by a transmission type electron microscope (TEM), and a doublewalled CNT refers to CNTs in which half or more of the entire CNTs have two layers, and a single-walled CNT refers to CNTs in which half or more of the entire CNTs have a single layer. As the number of layers becomes smaller, the CNT 10 becomes more flexible and more easily constitutes a continuous network; thus, since, as the number of layers becomes smaller, more contact points among CNTs required for forming the continuous network are provided, it becomes possible to easily form the continuous network more desirably.

The specific surface area of the CNT 10 contained in the carbon nanotube-elastomer composite material 100 has 200 m$^2$/g or more, preferably 400 m$^2$/g or more, more preferably 600 m$^2$/g or more, and also has 2000 m$^2$/g or less. The CNT 10 having such a large specific surface area makes it possible to provide more contact points among CNTs required for forming a continuous network and consequently to easily form the continuous network more desirably.

The volume ratio of the CNT structure 50 may be measured by using any conventionally known method; however, it is desirable to carry out measuring processes in which the size of the CNT structure 50 is measured by a digital microscope, and by measuring the area from the upper surface and the thickness from the lateral direction, the bulk volume is found by the product of the bottom surface area and the height. Therefore, in the present specification, the CNT structure 50 is evaluated by the bulk volume, and is not calculated by integrating the volume of the CNT 10.

Moreover, the length of the CNT 10 preferably has 1 µm or more, more preferably, 5 µm or more, and further more preferably, 10 µm or more. Since the CNT 10 having such a long length has many joined points between CNTs, it is possible to form a network structure having superior shape retaining property. Additionally, in the present invention, any CNT may be used as long as it contains CNT having such a long length, and the production method or the like thereof is not particularly limited.

(Sealing Material and Sheet-State Material)

Since the carbon nanotube-elastomer composite material 100 relating to the present invention is superior in tear strength and chemical resistance, it is desirably used for a sealing material and a sheet-state material.

The carbon nanotube-elastomer composite material 100 relating to the present invention may be used as an endless seal member. The endless seal member has an endless shape with its external shape continuously formed. The endless seal member is not only provided with a round shape in its external shape, but also formed in accordance with the shape of a groove or a member on which the seal material is disposed. As the endless seal member, for example, an O-ring having a round shape in its lateral cross-section or an X-ring may be used. The carbon nanotube-elastomer composite material 100 may be used as a dynamic seal, such as, for example, rotation axis seal, reciprocally moving seal, rod seal, piston seal, and the like. Alternatively, it may be also used as a static seal, such as, for example, a gasket.

(Elastomer)

The elastomer 30 contained in the carbon nanotube-elastomer composite material 100 is not particularly limited, as long as it has a thermally decomposition temperature of 150° C. or more. The elastomer 30 is preferably a thermoplastic elastomer or rubber. In particular, it is preferably fluoro-rubber having high heat resistance (binary fluoro-rubber, ternary fluoro-rubber). As the elastomer 30, examples thereof include elastomers, such as natural rubber (NR), epoxidized natural rubber (ENR), styrene-butadiene rubber (SBR), nitrile rubber (NBR), chloroprene rubber (CR), ethylene-propylene rubber (EPR, EPDM), butyl rubber (IIR), chlorobutyl rubber (CIIR), acrylic rubber (ACM), silicone rubber (Q), fluoro-rubber (FKM), butadiene rubber (BR), epoxidized butadiene rubber (EBR), epichlorohydrin rubber (CO, CEO), urethane rubber (U), polysulfide rubber (T) and the like; thermoplastic elastomers, such as olefin-based (TPO), polyvinyl chloride-based (TPVC), polyester-based (TPEE), polyurethane-based (TPU), polyamide-based (TPEA) and styrene-based (SBS) elastomers; and mixtures of these. Moreover, the elastomer 30 may further contain additives and the like, such as a crosslinker, a crosslinking initiator, an oxidation inhibitor, etc.

(Production Method)

The following description will discuss a production method for the above-mentioned carbon nanotube-elastomer composite material relating to the present invention. Additionally, the production method to be explained below is exemplary only, and the production method for the carbon nanotube-elastomer composite material relating to the present invention is not intended to be limited thereby.

The production method of the carbon nanotube-elastomer composite material relating to the present invention, which is different from the conventional production method, is characterized by having a process for fibrillating the CNTs to be combined with an elastomer and another process in which to the carbon nanotube-elastomer composite material, a curing agent is added by using open rolls to be distributed so that a molded body is obtained, in a separated manner. By using these two processes, a continuous network of the CNTs can be constituted in the elastomer so that it becomes possible to improve the tear strength and chemical resistance. That is, when a strong shearing force is applied to the CNTs, both of fibrillation in which the bunch (bundle) of the CNTs is released and cutting of the CNT occur. In order to form a highly developed continuous network of the CNTs, it is necessary to obtain CNT having a high aspect ratio by fibrillating CNTs without cutting the CNTs. Moreover, when rubber is mixed into CNTs, the CNTs may be aggregated because surface energies between the CNT and rubber are different from each other. When the CNTs are aggregated, it is not possible to obtain a highly developed continuous network structure of the CNTs. Therefore, by distributing (disposing) the CNTs as roughly as possible from the positional point of view, the network structure is constructed. By the continuous network, the carbon nanotube-elastomer composite material that is superior in tear strength and chemical resistance can be produced.

In the carbon nanotube-elastomer composite material relating to the present invention, it is important to have the CNT not bundled, but fibrillated. In this case, "fibrillate" means that fibers are disintegrated. The expression "disintegrated" means that the CNT has its surface measurable by a gas adsorption method exposed from the bundle thereof.

Moreover, in the present invention, it is important to have the CNTs not aggregated in one place, but distributed uniformly in the elastomer. In order to capture thermal radicals within small moving distances, the CNTs need to be uniformly distributed in the elastomer. Moreover, by making the CNTs physically in contact with one another, the stabilizing energy at the time of capturing thermal radicals can be made greater.

The CNT to be used for producing the carbon nanotube-elastomer composite material relating to the present invention may be produced by using methods disclosed by, for example, International Publication No. WO2006/011655 (single-walled CNT), International Publication No. WO2012/060454 (multi-walled CNT) and Japanese Translation of PCT International Application Publication No. 2004-526660 (multi-walled CNT). Since the CNT produced by these production methods has a small diameter and few number of layers, it has a very large specific surface area. For this reason, since many contact points among CNTs required for forming a continuous network are provided, it becomes possible to easily form the continuous network, making it possible to desirably improve the tear strength and the chemical resistance of the carbon nanotube-elastomer composite material.

(CNT Drying Process)

Although the CNTs are formed as an aggregate, the CNTs are mutually adhered to one another due to surface tension of water in a state where moisture is adsorbed thereon, and the CNTs become hardly disintegrated, failing to provide superior dispersibility in the elastomer. By heating the CNTs to 180° C. or more, preferably, 200° C. or more, this is maintained at 10 Pa or less, preferably, 1 Pa or less, for 24 hours or more, preferably, 72 hours or more, so that the moisture adhered onto the surface of the CNTs is removed. By removing the moisture on the CNT surface, it becomes possible to improve wettability to a solvent in the next process so that the fibrillating process can be easily carried out. Thus, the continuous network of the CNTs can be easily formed so that the tear strength and chemical resistance in the carbon nanotube-elastomer composite material can be improved.

(Classifying Process)

By setting the size of the CNT aggregate within a predetermined range, the CNT aggregate is preferably set to have a uniform size. The CNT aggregate also includes a synthesized product having a lump shape with a large size. Since the lump-shaped CNT aggregate having a large size has a different dispersibility, the dispersibility is lowered. Therefore, when only the CNT aggregates which have passed through a net, filter, mesh or the like and from which the large lump-shaped CNT aggregates have been excluded, are used in processes thereafter, the dispersibility of the CNTs in the carbon nanotube-elastomer composite material can be improved.

(Pre-Dispersion Process)

When the CNT having a large aggregated lump shape, as it is, is loaded into a dispersing machine, this tends to cause clogging; therefore, an organic solvent is added to a dried CNT so that by fibrillating the CNTs into a bundle having a size of about 10 μm or less, the yield in the dispersion process can be improved. The pre-dispersion process is, for example, carried out by stirring the CNTs of 0.1 part by weight, prepared by being added to an organic solvent, at 500 rpm or more by using a cross-head stirrer for 8 hours or more. As the organic solvent in which the CNTs are dispersed, for example, MIBK may be used. By carrying out the pre-dispersion process, the fibrillating can be more easily carried out in the fibrillating process that is the succeeding process. As the fibrillating is proceeded, a continuous network can be constructed in the elastomer so that it becomes possible to improve the tear strength and chemical resistance in the carbon nanotube-elastomer composite material.

(CNT Fibrillating Process)

The CNTs are fibrillated in an organic solvent such as MIBK. The conventionally known dispersing method may be adopted; however, in particular, by using a device that disperses the CNTs by using a shearing force in a turbulent flow state, such as a jet mill or the like, the CNTs can be fibrillated while reducing damages to the CNT. In particular, in a wet-type jet mill, a mixture in a solvent is formed into a high-speed flow, and this is put into a pressure-proof container in a tightly closed state, and press-fed from a nozzle. The CNTs are dispersed by collision between opposing currents inside the pressure-proof container, collision against the container wall, and turbulent flows, shearing flows or the like generated by the high-speed flow. In the case when, as the wet-type jet mill, for example, a nano-jet pal (JN10, JN100, or JN1000) made by JOKOH CO., LTD., is used, the processing pressure in the dispersing process is preferably set at a value within a range from 10 MPa or more to 150 MPa or less.

Upon applying a shearing force by a pressure higher than that described above, the CNT is cut in a fiber axial direction. This fact has been confirmed by Raman spectrometry for use in evaluating defects in the CNT. Moreover, in the case of a pressure of 10 MPa or less, it is not possible to efficiently fibrillate the CNTs. That is, by applying a pressure of 10 MPa to 150 MPa, fibrillating rather than cutting progresses in the CNTs to provide a higher aspect ratio. This high aspect ratio is required for allowing the CNTs to construct a highly developed continuous network structure. Moreover, in the present embodiment, in the dispersing process of the CNT aggregate, a jet mill (HJP-17007) made by Sugino Machine Limited may be used.

By fibrillating the CNTs to about 100 nm or less, it becomes possible to increase the area of the interface between the CNT and the elastomer in the carbon nanotube-elastomer composite material. Since the contact points between the mutual CNTs required for forming the continuous network increase as the specific surface area becomes greater, it becomes possible to easily form the continuous network, and consequently to improve the tear strength and chemical resistance in the carbon nanotube-elastomer composite material.

(Elastomer Kneading Process)

An appropriate amount of an elastomer is added to the CNT dispersion solution thus obtained so as to form a CNT-elastomer solution. By adjusting the added amounts of the elastomer and the crosslinker, the final concentration of a CNT can be adjusted. The elastomer kneading process may be carried out by using operations in which, for example, the elastomer and the crosslinker are added to the CNT dispersion solution and this is mixed by using a cone-shaped magnet agitator in a beaker. In this case, it is preferable to mix this at 100 rpm or more at room temperature for 12 hours or more, and also to knead the fibrillated CNTs and the elastomer. By using an organic solvent having high affinity (having closer solubility parameters) to the CNT and the elastomer, the CNTs and the elastomer are uniformly distributed. As a result, it becomes possible to easily form a continuous network, and consequently to improve the tear strength and chemical resistance of the carbon nanotube-elastomer composite material.

(Solvent Removing Process)

The organic solvent used in the CNT dispersion is removed. At this time, by using an organic solvent having high affinity (having closer solubility parameters) to the CNT and the elastomer, the CNT and the elastomer can maintain uniform structures, without being phase-separated even in a solvent evaporation process. In the solvent removing process, the beaker containing the CNT-elastomer solution therein is maintained on a plate (for example, iron plate), for example, at a temperature of 80° C. (or a temperature of 10° C. or more to 50° C. or less than the boiling temperature of the organic solvent) so that the organic solvent is removed to a certain degree. Moreover, by maintaining it at a low temperature of 20° C. or more to 50° C. or less than the boiling temperature of the organic solvent by using a vacuum oven, the organic solvent can be completely removed. Since the organic solvent causes deterioration of the elastomer, it is important to positively remove the organic solvent so as to improve the tear strength and chemical resistance in the carbon nanotube-elastomer composite material. Thus, a carbon nanotube-elastomer master batch can be obtained.

(Kneading by Open Roll)

The carbon nanotube-elastomer master batch is kneaded by using open rolls. The temperature of the rolls is preferably set to 20° C. or more lower than the crosslinking start temperature and 50° C. or more higher than room temperature. Moreover, the ratio of the number of rotations of the rolls is set to 1.2 or less, preferably, to 1.15 or less, more preferably, to 1.1 or less. In general, in the open rolls, as the temperature becomes lower and the ratio of rotation numbers becomes higher, a higher shearing force can be applied so that the material can be well kneaded; however, in the present process, the master batch is kneaded by using a slow shearing force at high temperature with a low rotation ratio. By setting the roll temperature as high as possible, the viscosity of the elastomer is lowered to reduce the shearing force applied to the CNT. Moreover, by setting the rotation ratio to 1.2 or less, the shearing force to be applied to the CNT is lowered so that the shortened length of the CNT by the cutting is desirably suppressed. As a result, the CNTs form a continuous network, and the tear strength and chemical resistance of the carbon nanotube-elastomer composite material can be improved. At this time, a crosslinker, a crosslinking initiator and other additives may be added thereto.

By performing a tight milling to the resulting carbon nanotube-elastomer composite material, a sheet-shaped material containing the CNT, elastomer, and other additives therein can be obtained. The sheet-shaped material is filled into a metal mold or the like, and heated while being pressed by a hot press or a vacuum press so as to be molded. At this time, the crosslinking operation may be carried out. By carrying out the molding process, the material can be formed into a sealing material or the like, and moreover, by carrying out the crosslinking operation, a three-dimensional crosslinking process is carried out so that the tear strength and chemical resistance can be improved.

EXAMPLES

Example 1

By using a single-walled CNT produced by the method described in International Publication No. WO2006/011655 and fluoro-rubber (Daiel-G912, made by Daikin Industries, Ltd.), a carbon nanotube-elastomer composite material of Example 1 was produced. Based upon observations made by a TEM, the single-walled CNT used in Example 1 had a length of 100 μm and an average diameter of 3.0 nm and its number of layers was one. Moreover, by taking out a lump of 50 mg, adsorption/desorption isothermal curves in liquid nitrogen at 77K were measured by using a BELSORP-MINI (made by BEL Japan Inc.) (adsorption equilibrium time was set to 600 seconds). Based upon these adsorption/desorption isothermal curves, the specific surface area was measured by using a method by Brunauer, Emmett, Teller; thus about 1000 $m^2/g$ was obtained.

In the single-walled CNT, the CNT aggregate was placed on one side of a mesh having a sieve opening of 0.8 mm, and by sucking air by using a vacuum cleaner with the mesh interpolated therebetween, those materials passed through the mesh were collected so that lump-shaped CNT aggregates having a large size were removed from the CNT aggregate so as to be classified (classifying process).

The CNT aggregate was measured by a Karl Fischer reaction method (Coulometric titration-type trace moisture measuring device CA-200 type made by Mitsubishi Chemical Analytic Co., Ltd.). After the CNT aggregate had been dried under predetermined conditions (maintained under vacuum at 200° C. for 1 hour), the vacuum state was released in a glove box in a drying nitrogen gas flow, and about 30 mg of the CNT aggregate was taken out, and shifted to a glass boat of a moisture meter. The glass boat was moved to a vaporization device, and then heated at 150° C. for two minutes, and moisture evaporated at this period was carried by a nitrogen gas, and subjected to a reaction with iodine by the Karl Fischer reaction in the neighboring process. Thereafter, based upon an electric quantity required for generating iodine the amount of which was the same as the iodine consumed at that time, the moisture amount was detected. By using this method, the CNT aggregate before the drying process contained moisture of 0.8 parts by weight. After the drying process, the moisture of the CNT aggregate was reduced to 0.3 parts by weight.

The classified CNT aggregate (100 mg) was precisely measured, and loaded into a 100 ml flask (with three necks: for vacuum and for temperature adjustment), and after having been heated to reach 200° C. under vacuum, this was maintained for 12 hours so as to be dried. After the drying process, while being kept in heating/vacuum processing state, this was injected 20 ml of a dispersion medium MIBK (methyl isobutyl ketone) (made by Sigma-Aldrich Co., LLC.) at a temperature of 100° C. or more, and the CNT aggregate was prevented from being exposed to the atmosphere (drying process).

Moreover, this was further added MIBK (made by Sigma-Aldrich Co., LLC.) to reach 300 ml. To the beaker, an agitator was put, and the beaker was sealed by aluminum foil so as to prevent the MIBK from being evaporated, and stirred by a stirrer at 600 rpm for 12 hours at normal temperature.

In the dispersion process, by using a wet-type jet mill (wet-type jet mill (HJP-7000) made by Sugino Machine Limited Co., Ltd.) was used, and the mixture was allowed to pass through a passage of 0.13 mm at a pressure of 100 MPa, and by allowing this to further pass through the passage at a pressure of 120 MPa, the CNT aggregate was dispersed in the MIBK so that a CNT dispersion solution having a weight concentration of 0.033 parts by weight was obtained.

The CNT dispersion solution was further stirred by a stirrer for 24 hours at normal temperature. At this time, the solution was heated to 70° C. so that the MIBK was evaporated to set the amount to about 150 ml. The weight concentration of the CNT at this time became about 0.075 parts by weight (dispersion process). Thus, the CNT dispersion solution of the present invention was obtained.

In the present example, fluoro-rubber (Daiel-G912, made by Daikin Industries, Ltd.) was used as a compound containing fluorine. In the case when the weight of the entire carbon nanotube-elastomer composite material was set to 100 parts by weight, 100 mg of the fluoro-rubber was added to 100 ml of the CNT dispersion solution so as to set the CNT content to 1 part by weight, with the fluoro-rubber content being set to 99 parts by weight, and this was stirred at room temperature for 16 hours under the condition of about 300 rpm so as to concentrate the entire amount to about 50 ml.

The sufficiently mixed solution was poured into a beaker or the like, and dried at 80° C. for 2 days. Moreover, this was further put into a vacuum drying furnace of 80° C., and dried for 2 days so that the organic solvent was removed, thereby obtaining a master batch.

Twin rolls (ø6"×L15 test roll machine, front and rear independent variable speed, made by Kansai Roll Co., Ltd.) were used, and the master batch was wound around the rolls. The temperature of the rolls was 70° C., the rotation speed ratio was 1.2, the front wheel rotation speed was 23.2 rpm, the rear wheel rotation speed was 18.9 rpm, and the roll interval was set to 0.5 mm. While the sample was tightly milled through the rolls, a crosslinker (triallyl isocyanurate (TAIC), 4 phr) and a crosslinking initiator (perhexa 25B, 1.5 phr) were added thereto. Thereafter, by using a metal mold, this was heated and molded at 270° C. for 10 minutes, and by further carrying out a heating process at 180° C. thereon for 4 hours or more, the crosslinking was further progressed so that a carbon nanotube-elastomer composite material of example 1 was obtained.

Example 2

In Example 2, by using the same single-walled CNT (hereinafter, referred to also as SG-SWNT) as that of Example 1, the contents were altered. By using the SG-SWNT (0.1 part by weight) and ternary fluoro-rubber (FKM) (Daiel-G912, made by Daikin Industries, Ltd.), the same method as that of Example 1 was carried out so that a carbon nanotube-elastomer composite material of Example 2 was produced.

Example 3

By using the SG-SWNT (10 parts by weight) and ternary FKM (Daiel-G912, made by Daikin Industries, Ltd.), the same method as that of Example 1 was carried out so that a carbon nanotube-elastomer composite material of Example 3 was produced.

Example 4

In Example 4, as the multi-walled CNT, Nanocyl having 5 to 10 graphene layers was used. By using Nanocyl-MWNT (5 parts by weight) and ternary FKM (Daiel-G912, made by Daikin Industries, Ltd.), the same method as that of Example 1 was carried out so that a carbon nanotube-elastomer composite material of Example 4 was produced.

Example 5

In Example 5, as the multi-walled CNT, CNano having 5 to 10 graphene layers was used. By using CNano-MWNT (5 parts by weight) and ternary FKM (Daiel-G912, made by Daikin Industries, Ltd.), the same method as that of Example 1 was carried out so that a carbon nanotube-elastomer composite material of Example 5 was produced.

Example 6

In Example 6, as the elastomer, binary fluoro-rubber (FKM) was used. By using SG-SWNT (1 part by weight) and binary FKM (Daiel-G801, made by Daikin Industries, Ltd.), the same method as that of Example 1 was carried out so that a carbon nanotube-elastomer composite material of Example 6 was produced.

Example 7

In Example 7, as the elastomer, hydrogenated nitrile rubber (H-NBR) was used. By using SG-SWNT (1 part by weight) and H-NBR (hydrogenated nitrile rubber, Zetpol 2020, made by Zeon Corporation), a composite material production was carried out. In the present system, as the crosslinking material, 1.5 phr of perhexa 25B was added thereto to carry out the crosslinking process (with no TAIC added thereto).

In Example 8, as the elastomer, acrylic rubber (ACM) was used. By using SG-SWNT (1 part by weight) and ACM (acrylic rubber, Nipol AR31, made by Zeon Corporation), a composite material production was carried out. In the present system, as the crosslinking material, 1.5 phr of perhexa 25B was added thereto to carry out the crosslinking process (with no TAIC added thereto).

Comparative Example 1

In Comparative example 1, carbon black was used in place of CNT. By using CB (MAF, 10 parts by weight, made by Tokai Carbon Co., Ltd.) and ternary FKM (Daiel-G912, made by Daikin Industries, Ltd.), the same method as that of Example 1 was carried out so that a carbon nanotube-elastomer composite material of Comparative example 1 was produced.

Comparative Example 2

In Comparative example 2, carbon fibers (CF) were used in place of CNT. By using pitch-based carbon fibers (Dialead, 200 μm, 10 parts by weight, made by Mitsubishi Chemical Corporation) and ternary FKM (Daiel-G912, made by Daikin Industries, Ltd.), the same method as that of Example 1 was carried out so that a carbon nanotube-elastomer composite material of Comparative example 2 was produced.

Comparative Example 3

As Comparative example 3, a sample was produced by using only the elastomer. By adding TAIC and perhexa 25B to ternary FKM simple substance, the sample of Comparative example 3 was produced.

(Molding and Processing of Carbon Nanotube-Elastomer Composite Material)

Each of the carbon nanotube-elastomer composite materials of Examples 1 to 8 and Comparative examples 1 to 3 was put into a metal mold, and gas releasing processes were carried out three times in the vacuum hot pressing process. In the vacuum oven, this was maintained at 170° C. for 15 minutes, and was then maintained at 180° C. for 4 hours in a gear oven (atmospheric pressure). A sealing material and a sheet-shaped material composed of the carbon nanotube-elastomer composite material were obtained.

(Measurements of CNT Added Amount)

With respect to the carbon nanotube-elastomer composite materials of the Examples and Comparative examples, the added amount of CNT was measured by the following method. By using a differential heat/thermogravimetry simultaneous measuring apparatus (TG/DTA, STA7000, made by Hitachi High-Technologies), measurements were carried out. In a primary temperature-raising process, while supplying 200 ml/min of nitrogen thereto, the material temperature was raised from room temperature to 800° C. at 1° C./min. In the primary temperature-raising process, only the elastomer was sublimated to leave CNT as a residual component. In the case when carbon fillers or the like other than the CNT were contained, a secondary temperature-raising process was carried out. In the secondary temperature-raising process, while supplying 200 ml/min of pure air thereto, the material temperature was raised from room temperature to 800° C. at 1° C./min. In the pure air, the CNT and carbon fillers were burned at conventionally known temperatures to cause a weight reduction. Based upon the weight reduction, the CNT filling amount was calculated. FIG. 3 shows the results of measurements of the CNT added amount.

(Volume Measurements of CNT Structure)

With respect to the carbon nanotube-elastomer composite materials of the Examples and Comparative examples, the CNT volume was measured by the following method. A sample was set in a tube-shaped furnace, and this was subjected to a heating treatment at 500° C. for 6 hours under a nitrogen atmosphere so that matrix components were removed by thermal decomposition. With respect to the volume of the CNT structure, the thickness and lengths of the respective sides of the sample on the sheet were measured by a micrometer, and by multiplying these values, the volume was found.

FIG. 3 shows the results of volume measurements of the CNT structure. In the case of the carbon nanotube-elastomer composite material of the Examples, the ratio of the bulk volume of a CNT structure 50 formed by the residual CNTS 10 after the burning process relative to the volume of the carbon nanotube-elastomer composite material 100 prior to the burning process was set to 0.5 or more such that it was found that the CNTs 10 were made in contact with one another in the elastomer to consequently form a continuous network having a dynamic holding force. On the other hand, in the case of the carbon nanotube-elastomer composite material of the Comparative examples, the ratio of the volumes was 0.2 or less, with the result that the continuous network was not sufficiently formed, thereby failing to provide the dynamic holding force.

(Tear Strength)

With respect to each of the carbon nanotube-elastomer composite materials of the Examples and Comparative examples, the tear strength was measured by using the following method. The CNT elastomer composite material film-formed into a thickness of 2 mm was cut into a sample of a crescent type without any notches defined in JIS K-6252 by using punching blades. To this, notches of 1 mm were formed by using a notch cutting-in jig to provide a test piece. By using a tensile tester (autograph, AG-X, 10 kN), the test piece was pulled at a speed of 500 mm/min so that the tear strength was calculated. The tear strength was a value obtained by dividing the highest stress by the film thickness.

FIG. 3 shows the results of measurements of the tear strength of the carbon nanotube-elastomer composite material. In the carbon nanotube-elastomer composite material of each of the Examples, the tear strength was 10 N/mm or more, and it was found that the CNTs 10 were made in contact with one another in the elastomer to form a continuous network having a dynamic holding force. On the other hand, in the carbon nanotube-elastomer composite material in each of the Comparative examples, the tear strength was less than 10 N/mm, and it was found that the sufficient continuous network was not formed, thereby failing to obtain a dynamic holding force.

(Storage Modulus and Loss Tangent)

With respect to each of the carbon nanotube-elastomer composite materials of the Examples and Comparative examples, the storage modulus and loss tangent were measured by using the following method. Measurements were carried out by using a dynamic viscoelasticity measuring device (RSA2000, made by TA instruments). While supplying nitrogen thereto at 200 ml/min, the material was temperature-raised from room temperature to the glass transition point (TG) −50° C. at 5° C./min.

FIG. 3 shows the results of measurements of the viscoelasticity of the carbon nanotube-elastomer composite materials. In each of the carbon nanotube-elastomer composite materials of the Examples, the storage modulus at 100° C. as well as at 150° C. was $5 \times 10^6$ Pa or more to maintain behaviors as rubber. On the other hand, in the Comparative examples, the elastic modulus at 100° C. was $5 \times 10^6$ Pa or less, thereby losing elastic characteristics as rubber. Moreover, the loss tangent, which is a ratio of the loss elastic modulus relative to the storage modulus, was 0.2 or less at 150° C. in the Examples, thereby exerting elasticity; however, in the Comparative examples, it was 0.2 or more, thereby exerting a viscous characteristic.

(Chemical Resistance Characteristic)

From a sheet of a CNT elastomer composite material of 2 mm in thickness, a dog bone type test piece in compliance with JIS K 6251 was cut out, and this was immersed in methyl isobutyl ketone (MIBK) for 72 hours. The liquid temperature during the immersing process was kept at 25° C.±1° C. The test pieces before and after the immersion were subjected to a tensile test at 20 mm/min by a tensile tester (autograph, AG-X, made by Shimadzu Corporation) so that the tensile strength was found. The test was carried out on each of the samples at least three times, and its average value was used as the tensile strength of the samples. The difference between values of the tensile strength of the sample after the immersion and the tensile strength of the sample before the immersion was found on each of the samples.

As the chemical resistance characteristic of the carbon nanotube-elastomer composite material, the ratio of the value of the tensile strength of the sample after the MIBK immersion relative to the tensile strength thereof before the MIBK immersion is shown in FIG. 3. In the carbon nanotube-elastomer composite materials of the Examples, it was found that the difference of values between the tensile strengths of the sample before and after the MIBK immersion was 4 MPa or less so that the CNTs 10 in the elastomer were made in contact with one another to form a continuous network having a dynamic holding force, thereby improving the chemical resistance characteristic. On the other hand, in the carbon nanotube-elastomer composite materials of the Comparative examples, it was found that the difference of values between the tensile strengths of the sample before and after the MIBK immersion was 4 MPa or more, with the result that the continuous network was not sufficiently formed, thereby failing to obtain a sufficient chemical resistance characteristic.

(Oil Resistant Characteristic)

From a sheet of a CNT elastomer composite material of 2 mm in thickness, a dog bone type test piece in compliance with JIS K 6251 was cut out, and this was immersed in gasoline oil (gasoline 85%, ethanol 15%) for 72 hours. The liquid temperature during the immersing process was kept at 25° C.±1° C. The test piece before and after the immersion was subjected to a tensile test at 20 mm/min by a tensile tester (autograph, AG-X, made by Shimadzu Corporation) so that the tensile strength was found. The test was carried out on each of the samples at least three times, and its average value was used as the tensile strength of the samples. The difference between values of the tensile strength of the sample after the immersion and the tensile strength of the sample before the immersion was found on each of the samples.

As the oil resistant characteristic of the carbon nanotube-elastomer composite material, the difference in Shore A hardness of the sample after the gasoline oil immersion relative to the tensile strength thereof before the gasoline oil immersion is shown in FIG. 3. In the carbon nanotube-elastomer composite materials of the Examples, it was found that the difference in Shore A hardness values of the samples before and after the gasoline oil immersion was 4 or less so that the CNTs 10 in the elastomer were made in contact with one another to form a continuous network having a dynamic holding force, thereby improving the oil resistant characteristic. On the other hand, in the carbon nanotube-elastomer composite materials of the Comparative examples, it was found that the difference in Shore A hardness values of the samples before and after the gasoline oil immersion was 4 or more, with the result that the continuous network was not sufficiently formed, thereby failing to obtain a sufficient oil resistant characteristic.

(Pore Distribution of CNT Structure)

With respect to the carbon nanotube-elastomer composite materials of the Examples and Comparative examples, the pore distribution of the CNT structure was measured by the following method. The sample was set in a tube-shaped furnace, and subjected to a heating treatment at 500° C. for 6 hours, under a nitrogen atmosphere so that the matrix components were removed by thermal decomposition. The distribution of pore diameters of the obtained CNT residual matters was measured by a mercury porosimeter (PoreMaster 60GT made by Quantachrome Instruments). The measurements were carried out in compliance with Washburn method, with the mercury pressure being varied from 1.6 kPa to 420 MPa.

The pore distribution of the CNT structure is shown in FIG. 3. In the carbon nanotube-elastomer composite materials of the Examples, when maintained under a nitrogen atmosphere at 500° C. for 6 hours or more, with respect to the pore distribution in the residual CNT structure 50, one or more peaks were found within a range from 1 nm or more to 100 μm or less so that it was found that the CNTs 10 were highly fibrillated in the elastomer 30 to form a continuous network, with the CNTs 10 being made in contact with one another.

(Change in Conductivity Due to Strain)

From the carbon nanotube-elastomer composite material, a dog bone type test piece in compliance with JIS K 6251 was cut out. The test piece was set into a tensile tester (autograph, AG-X, made by Shimadzu Corporation). An insulating polyimide sheet was inserted between the test piece and the grabbing tool of the tensile tester so as to be insulated. Next, electrodes were attached to the upper and lower portions of the test piece, and signals from the respective electrodes were measured by a resistance measuring device (2000/200-SCAN, made by Keitheley Instruments) so that the resistance of the sample was measured. The conductivity of the sample was calculated from the cross-sectional area and the distance between electrodes of the sample. Next, while pulling the sample at 10 mm/min, the variations in resistance were measured. The distance between electrodes was calculated from the tensile speed, and the cross-sectional area of the sample was calculated from the extension rate by setting a Poisson ratio of the sample at 0.5, so that the conductivity at each strain was calculated.

FIG. 3 shows variations in conductivity due to strain in the carbon nanotube-elastomer composite material. In the carbon nanotube-elastomer composite materials of the Examples, the conductivity was confirmed at the time of strain of 20%, and when the CNTs 10 was highly fibrillated in the elastomer 30 so that it was found that by forming the continuous network, with the CNTs 10 being made in contact with one another, the conductivity can be exerted by the continuous network even when a strain is applied thereto. On the other hand, in the carbon nanotube-elastomer composite materials in the Comparative examples, it was found that the conductivity was below the measurable limit at the time of strain of 20%, thereby failing to obtain the conductivity. From these points, it was estimated that in the carbon nanotube-elastomer composite materials of the Comparative examples, the continuous network was not sufficiently formed, thereby failing to maintain the conductivity.

(Tensile Strength)

With respect to the carbon nanotube-elastomer composite materials of the Examples and Comparative examples, the tensile strength was measured by the following method. By using a precise versatile tester that is, a tensile tester (Autograph, AG-1 kN), measurements were carried out. The sample was maintained at 150° C. in a thermostatic chamber. The measurements were carried out based upon JIS K 6251.

The results of tensile strength measurements are shown in FIG. 3. In the carbon nanotube-elastomer composite materials of the Examples, the tensile strength in the tensile test (in compliance with JIS K6251) became 1 MPa or more, and it was found that even under high temperatures, the rubber elasticity inherent to the elastomer can be maintained. On the other hand, in the case of the carbon nanotube-elastomer composite materials of the Comparative examples, it became smaller than 1 MPa, thereby causing a liquid state.

(Linear Expansion Coefficient)

With respect to the carbon nanotube-elastomer composite materials of the Examples and Comparative examples, the linear expansion coefficient was measured by the following method. By using a thermo-mechanical analyzer (TMA/SS) (TMA7000, made by Hitachi High-Technologies Corporation), measurements were carried out. While supplying 200 ml/min of nitrogen thereto, the linear expansion coefficient of each of the samples was measured, with the temperature being raised at a temperature raising rate of 5° C./min, with the pushing pressure being set to 50 μg.

The results of measurements of the linear expansion coefficient are shown in FIG. 3. In the carbon nanotube-elastomer composite materials of the Examples, the linear expansion coefficient was $5\times10^{-4}$/K or less so that it was found that even a sealing material attached at room temperature is not slackened by a thermal expansion, and can be used even at high temperatures. On the other hand in the case of the carbon nanotube-elastomer composite material of the Comparative examples, it was found that the thermal expansion coefficient exceeds $5\times10^{-4}$/K and it is slackened by a thermal expansion.

(Glass Transition Temperature)

The glass transition temperature was measured by using a differential scanning calorimeter (DSC 7020, made by Hitachi High-Technologies Corporation). A sample (about 10 mg) was sealed in a sample pan made of aluminum, and temperature variations in the specific heat capacity were measured, while the temperature was raised at 5° C./min from −70° C., and a temperature change in specific heat capacity was measured. The temperature at which the specific heat capacity has first started to significantly change after a temperature rise is defined as "glass transition temperature".

FIG. 3 shows measurements of the glass transition temperature of the carbon nanotube-elastomer composite material. From the results of FIG. 3, it is found that the carbon nanotube-elastomer composite materials having a continuous network formed therein in the Examples have a glass transition temperature in the same manner as in the Comparative examples.

In accordance with the present invention, it is possible to provide a carbon nanotube-elastomer composite material superior in tear strength and chemical resistance, a seal material and a sealing material each produced using the same, and a method for producing the carbon nanotube-elastomer composite material.

What is claimed is:

1. A carbon nanotube-elastomer composite material consisting of a carbon nanotube and an elastomer, wherein
    the carbon nanotube has a diameter of 20 nm or less and the number of layers of 10 or less, the carbon nanotube is contained in an amount from 0.1 part by weight or more to 20 parts by weight or less relative to the total weight of the carbon nanotube and the elastomer, and
    a plurality of the carbon nanotubes constitutes a continuous network having a $V_a/V_0$ value of 0.5 or more in the elastomer wherein $V_0$ represents the initial volume of the carbon nanotube-elastomer composite material and $V_a$ represents the volume of the structure formed from the residual carbon nanotube when the composite material is maintained at a temperature of 400° C. or higher for 6 hours, while introducing nitrogen, the elastomer is thermally decomposed and the residual carbon nanotube form a structure.

2. A carbon nanotube-elastomer composite material dispersing consisting of a carbon nanotube and an elastomer, wherein
    a plurality of the carbon nanotubes constitutes a continuous network having a $V_a/V_0$ value of 0.5 or more in the elastomer wherein $V_0$ represents the initial volume of the carbon nanotube-elastomer composite material and $V_a$ represents the volume of the structure formed from the residual carbon nanotubes when the composite material is maintained at a temperature of 400° C. or higher for 6 hours, while introducing nitrogen, the elastomer is thermally decomposed and the residual carbon nanotube form a structure, and
    the continuous network has at least one or more peaks in a pore distribution within a range of 1 nm or more to 100 μm or less.

3. The carbon nanotube-elastomer composite material according to claim 1, wherein the carbon nanotube-elastomer composite material has a tear strength of 5 N/mm or more.

4. The carbon nanotube-elastomer composite material according to claim 1, wherein an elastic modulus at 100° C. of the carbon nanotube-elastomer composite material is higher by 20% or more than an elastic modulus at 100° C. of an elastomer composite material without containing the carbon nanotube.

5. The carbon nanotube-elastomer composite material according to claim 1, wherein a variation amount of tensile strength after the carbon nanotube-elastomer composite material has been immersed in methyl isobutyl ketone for 72 hours is 4 MPa or less.

6. The carbon nanotube-elastomer composite material according to claim 1, wherein a change in Shore A hardness after the carbon nanotube-elastomer composite material has been immersed in gasoline oil (gasoline 85%, ethanol 15%) for 72 hours is 4 or less.

7. The carbon nanotube-elastomer composite material according to claim 1, wherein a conductivity at the time of applying a strain of 20% to the carbon nanotube-elastomer composite material is located in a range from 50% or more to 150% or less relative to the conductivity at the time of a strain of 0%.

8. The carbon nanotube-elastomer composite material according to claim 1, wherein a tensile strength in a tensile test (in compliance with JIS K6251) at 20° C. or more to 150° C. or less is 5 MPa or more.

9. The carbon nanotube-elastomer composite material according to claim 1, wherein a storage modulus at 150° C. is 0.5 MPa or more, with a loss tangent being 0.1 or less.

10. The carbon nanotube-elastomer composite material according to claim 1, wherein in a range from room temperature to 150° C., a thermal expansion coefficient is $6 \times 10^{-4}$/K or less.

11. The carbon nanotube-elastomer composite material according to claim 1, wherein the carbon nanotube-elastomer composite material has a glass transition temperature in a range from −50° C. or more to 10° C. or less.

12. The carbon nanotube-elastomer composite material according to claim 1, wherein the carbon nanotubes have a specific surface area of 200 m$^2$/g or more.

13. The carbon nanotube-elastomer composite material according to claim 2, wherein the carbon nanotube has a diameter of 20 nm or less.

14. The carbon nanotube-elastomer composite material according to claim 2, wherein the number of layers of the carbon nanotube is 10 or less.

15. An endless seal material comprising the carbon nanotube-elastomer composite material according to claim 1, wherein the seal material has an endless shape with the outer shape being continuously formed.

16. A sealing material comprising the carbon nanotube-elastomer composite material according to claim 1.

* * * * *